(12) United States Patent
Van Walraven

(10) Patent No.: US 7,246,547 B2
(45) Date of Patent: Jul. 24, 2007

(54) ASSEMBLY OF A NUT BODY IN A PROFILED-SECTION ELEMENT

(75) Inventor: Jan Van Walraven, Mijdrecht (NL)

(73) Assignee: J. van Walraven Holding B.V., Mijdrecht (NL)

( * ) Notice: Subject to any disclaimer, the term of this patent is extended or adjusted under 35 U.S.C. 154(b) by 0 days.

(21) Appl. No.: 10/534,614

(22) PCT Filed: Oct. 29, 2003

(86) PCT No.: PCT/NL03/00736

§ 371 (c)(1),
(2), (4) Date: May 11, 2005

(87) PCT Pub. No.: WO2004/044440

PCT Pub. Date: May 27, 2004

(65) Prior Publication Data

US 2006/0078400 A1    Apr. 13, 2006

(30) Foreign Application Priority Data

Nov. 11, 2002  (NL)  .................. 1021893
Dec. 18, 2002  (NL)  .................. 1022190

(51) Int. Cl.
B25B 23/10  (2006.01)
F16B 39/00  (2006.01)
F16B 27/00  (2006.01)

(52) U.S. Cl. ...................... 81/461; 411/104
(58) Field of Classification Search ........... 81/461, 81/176.15, 176.2, 52, 451, 125, 124.2, 487, 81/488; 206/229–231; 411/85, 104
See application file for complete search history.

(56) References Cited

U.S. PATENT DOCUMENTS 2,383,573 A    8/1945  Tomsek
2,696,139 A *  12/1954 Attwood .................. 411/427
3,800,396 A *  4/1974  Puchner ................... 29/413
4,146,074 A *  3/1979  Kowalski .................. 411/111
4,575,295 A    3/1986  Rebentisch
4,823,650 A *  4/1989  Tuttle ..................... 81/124.2
4,836,065 A *  6/1989  Setliff .................... 81/124.2
4,917,553 A *  4/1990  Muller .................... 411/85
5,797,301 A *  8/1998  Huenke ................... 81/176.15
6,755,834 B2 * 6/2004  Amis ...................... 606/72
6,872,038 B2 * 3/2005  Westlake .................. 411/85
2002/0062128 A1* 5/2002  Amis ...................... 606/72
2003/0049094 A1  3/2003  Westlake
2004/0200323 A1* 10/2004 Ellerson .................. 81/176.15

FOREIGN PATENT DOCUMENTS

| DE | 19928144 A1 | 12/2000 |
|---|---|---|
| EP | 0149128 A1 | 7/1985 |
| EP | 0516321 A1 | 12/1992 |
| FR | 96.603 | 7/1973 |
| FR | 2515753 | 5/1983 |
| GB | 842334 | 7/1960 |
| WO | WO 96/33349 A1 | 10/1996 |

* cited by examiner

Primary Examiner—David B. Thomas
(74) Attorney, Agent, or Firm—Browdy and Neimark, PLLC

(57) ABSTRACT

An assembly tool (20) for a securing system. (1) The securing system comprises an elongate profiled-section element (2) having a longitudinal slot (6), which is delimited by two flanges, and an elongate nut body (3). The nut body is of a width which is less than the width of the longitudinal slot and a length (1) which is greater than the width of the longitudinal slot. The nut body is provided with a bore (8) and, on an underside, with a downwardly projecting spring (13).

13 Claims, 5 Drawing Sheets

ASSEMBLY OF A NUT BODY IN A PROFILED-SECTION ELEMENT

BACKGROUND OF THE INVENTION

1. Technical Field of the Invention

The invention relates to an assembly tool for a securing system comprising:

an elongate profiled-section element having a top side which is provided with two flanges which delimit a longitudinal slot, and which profiled-section element also has a base lying opposite the top side, an elongate nut body of a width which is less than the width of the longitudinal slot in the profiled-section element and a length which is greater than the width of the longitudinal slot in the profiled-section element, which nut body also has a top side, an underside and, surrounding it, two short sides and two long sides, the nut body also being provided with a bore and on the underside being provided with a downwardly projecting spring.

During assembly, the longitudinal axis of the nut body is brought into line with the longitudinal slot, and the nut body is introduced into the profiled-section element between the flanges with the underside facing towards the base of the profiled-section element, so that the spring engages on the base of the profiled-section element. Then, the nut body is rotated in order to engage behind the flanges, with the spring pressing the nut body towards the top side of the profiled-section element and onto the flanges.

2. Prior Art

A securing system of the type described above is known, for example, from EP 0 516 321. In a securing system of this type, it is known to introduce the nut body into the profiled-section element by hand. In the process, the nut body is pushed between the flanges of the profiled-section element, counter to the spring force, using one or more fingers, and then the nut body is rotated, an operation which generally requires two fingers.

Arranging a nut body in a profiled-section element by hand in this way is laborious and in practice causes problems on account of the frequently small size of the nut bodies used and the small slot width of the profiled-section element, with the result that the space available for the fingers during introduction and rotation of the nut is small. One or more fingers can become trapped. The opposite force exerted by the spring also makes it more difficult to introduce and rotate the nut body.

It is an object of the invention to facilitate the mounting of the nut body in a profiled-section element in a system of this nature.

OBJECT AND SUMMARY OF THE INVENTION

According to the invention, this object is achieved by an assembly tool which can be applied to the nut body, it being possible for the nut body to be introduced into the profiled-section element by means of the assembly tool, and it being possible for the assembly tool to be rotated, with the nut body rotating with it, and for the assembly tool to be removed from the nut body. This results in an assembly tool which makes the nut body easy to handle so that it can be introduced into the profiled-section element by simple operations.

In a preferred embodiment, the assembly tool is designed to be applied to the nut body by being fitted onto the nut body and to be removed from the nut body by being pulled off the nut body.

The assembly tool is preferably designed to engage in clamping fashion on the nut body. This creates a good grip for the assembly tool on the nut body, with the result that the nut body itself does not fall off the assembly tool when the nut body is hanging beneath the assembly tool.

In a preferred embodiment, the assembly tool comprises an engagement part for engaging on the nut body, an intermediate part connected to the engagement part, and a handling member connected to the intermediate part allowing the tool to be handled.

During assembly, the engagement part of the assembly tool is positioned on the nut. As a result of a compressive force being manually exerted on the handling member, the nut body is introduced into the profiled-section element. In the process, the intermediate part spans the distance between the top side of the profiled-section element and a bottom edge of the flanges. As a result of the handling member then being rotated, preferably by hand, the nut body is entrained in the rotary motion by the engagement part. When the nut body is then in the assembled state, the assembly tool can be removed from the nut body.

In a further preferred embodiment, the engagement part comprises a pressure-exerting surface and at least one projection which extends from the pressure-exerting surface substantially perpendicular to the pressure-exerting surface, the pressure-exerting surface having a minimum cross-sectional dimension which is such that it is no larger than the width of the longitudinal slot, and being designed to engage on the top side of the nut body during use in order to press the nut body into the profiled-section element between the flanges of the profiled-section element, the projection being designed to engage on a long side of the nut body during use, in such a manner that a rotary movement of the handling member and the pressure-exerting surface about an axis of rotation which extends substantially perpendicular to the pressure-exerting surface results in a rotary movement of the nut body, and the handling member being designed to be able to exert a compressive force and a rotational force on the nut body at a distance from the pressure-exerting surface.

During assembly, the pressure-exerting surface of the assembly tool is positioned on the top side of the nut, with the projection positioned along the long side of the nut body. The manual application of a compressive force to the handling member causes the nut body to be introduced into the profiled-section element. Subsequent manual rotation of the handling member causes the pressure-exerting surface with the projection to be rotated so that the nut body is entrained in the rotary motion by the projection. When the nut body is then in the assembled state, the pressure-exerting surface with the projection can easily be removed from the nut body. The result is a tool which is matched to the dimensions of the nut body and the slot width of the profiled-section element, making the nut body easy to handle and allowing it to be fitted into the profiled-section element by simple operations. It is preferable for a direction indicator, for example a stripe, to be applied to the handling member, which indicator, during assembly, indicates the position of the assembly tool and the nut body with respect to the longitudinal slot in the profiled-section element.

In a preferred embodiment, the handling member of the assembly tool comprises a handgrip. This makes the tool easier to handle.

In a further preferred embodiment, the intermediate part comprises a body with a maximum cross-sectional dimension which is smaller than the width of the longitudinal slot in the profiled-section element, the handling member being formed at one end of the body and the pressure-exerting surface being formed at the other end of the body, the pressure-exerting surface being positioned substantially perpendicular with respect to the centre axis of the body. This simple design of the assembly tool is favourable since it is easy to produce.

Preferably, the handling member has a minimum cross-sectional dimension which is larger than the width of the longitudinal slot in the profiled-section element, and the distance in the axial direction from the pressure-exerting surface to the handling member is at least equal to the distance between the top side of the profiled-section element and the bottom edge of the flange. This has the advantage that if the nut body is pressed into the slot by the assembly tool until the handling member touches the top of the flanges, the nut body has been introduced far enough into the profiled-section element to allow it to be rotated beneath the flanges.

It is preferable for a protuberance to be arranged on the pressure-exerting surface, this protuberance being designed to be fitted into the bore in the nut body during use. Furthermore, the protuberance is preferably located in the centre of the pressure-exerting surface. This makes it easy for the assembly tool to be fitted onto the nut body, with the pressure-exerting surface being positioned in an advantageous way, in particular in the longitudinal direction of the nut body.

In a preferred embodiment, two projections are arranged opposite one another on either side of the edge of the pressure-exerting surface in order, during use, to engage on the opposite long sides of the nut body, the distance between the outermost edges of the projections being smaller than the width of the longitudinal slot of the profiled-section element. The two projections enable the tool to engage around the nut body in the width direction, resulting in a more uniform transfer of the rotational force from the assembly tool to the nut body.

The projections are preferably designed to engage in clamping fashion on the nut body.

The handling member, the intermediate part and the engagement part are preferably formed integrally. This makes the tool more compact and more robust. It is preferably made in a single piece from plastic, which is simple and inexpensive in terms of the production technology required.

The invention also relates to a combination of an assembly tool and a nut body as described in claim 17. The invention also relates to a method according to claim 18.

A second aspect of the invention relates to a securing system according to the preamble of claim 20.

A securing system of this type is known. If, in the known securing system, the nut body is pushed into the profiled-section element in the longitudinal direction in order to reach the correct position, the free end of the spring slides over the base of the profiled-section element. Holes are often arranged in the base of the profiled-section element. The free end of the spring may then become hooked behind the edges of the holes, making assembly more difficult.

It is an object of the second aspect of the invention to overcome this problem.

This object is achieved, according to the invention, by a securing system in which the spring is provided, at the end which engages on the base of the profiled-section element, with a sliding part comprising a sliding foot.

In the assembled state of the nut body, the sliding foot engages on the base of the profiled-section element, sliding over the base as the sliding nut is displaced, with the result that the free end of the spring can no longer become hooked behind the holes which are present therein.

BRIEF DESCRIPTION OF THE DRAWINGS

The invention will be explained in more detail with reference to the drawing, in which:

FIG. 1 shows a securing system 1 which comprises an elongate profiled-section element 2 and a nut body 3.

BRIEF DESCRIPTION OF THE PREFERRED EMBODIMENTS OF THE INVENTION

Figure 1:
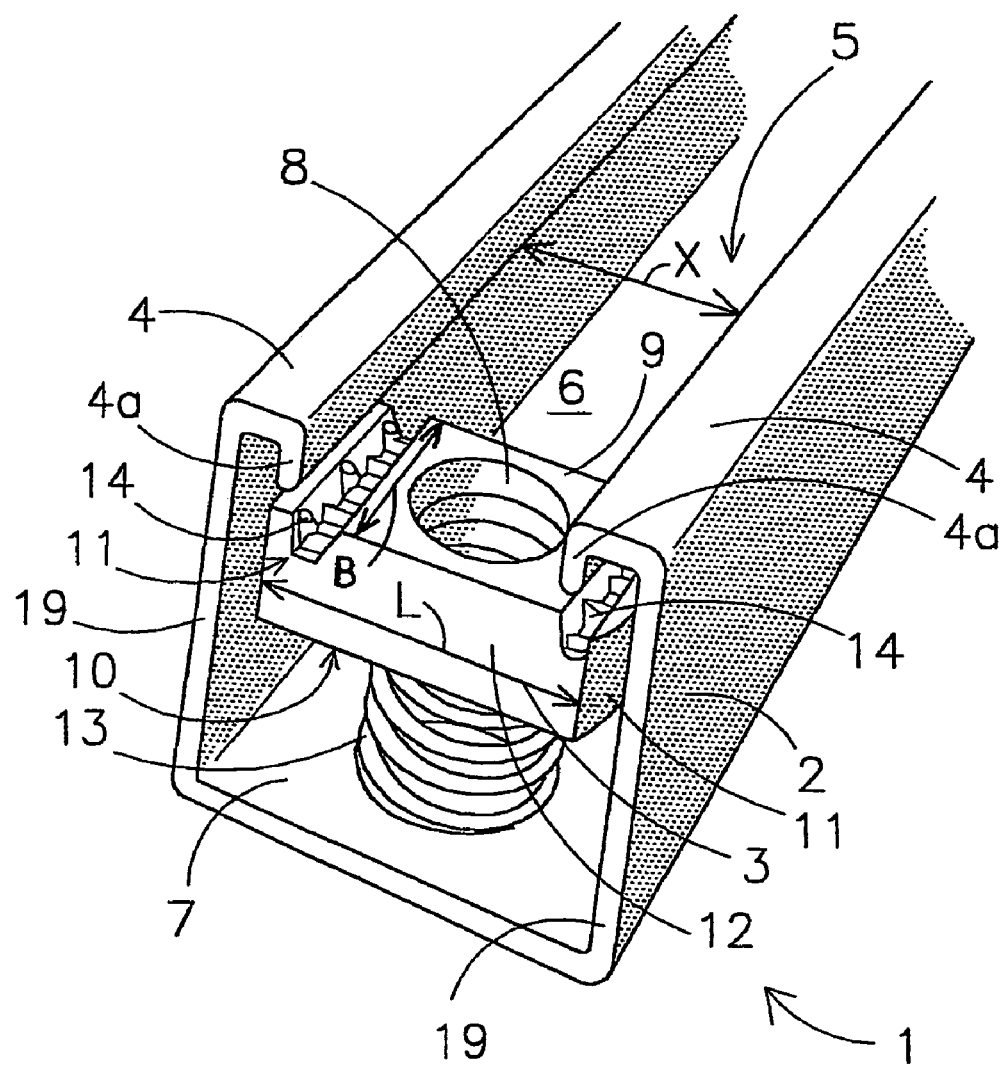
FIG. 1 shows a perspective view of a securing system having a profiled-section element and a nut body.

The profiled-section element 2 has a top side 5 which is provided with two flanges 4 with inwardly bent flange edges 4a which delimit a longitudinal slot 6. The profiled-section element 2 also has a base 7 lying opposite the top side 5. The flanges 4 and the base 7 are connected by side walls 19.

The nut body 3 is provided with a bore 8 which is provided with a screw thread. The nut body 3 is of a width B which is less than the width X of the longitudinal slot 6 of the profiled-section element 2. The nut body 3 is of a length L which is greater than the width X of the longitudinal slot 6 in the profiled-section element 2. The nut body 3 has a substantially planar top side 9 and a substantially planar underside 10 and, surrounding it, two short sides 11 and two long sides 12. The nut body 3 is preferably made from a metal strip. The nut body 3 is provided, at the underside 10, with a coil spring 13 which presses the nut body 3 upwards towards the flanges 4. It is also possible to fit another type of spring. In this exemplary embodiment, the nut body 3 is provided with grooves 14. In the assembled state, the flange edges 4a are received in the grooves 14.

Figure 2:
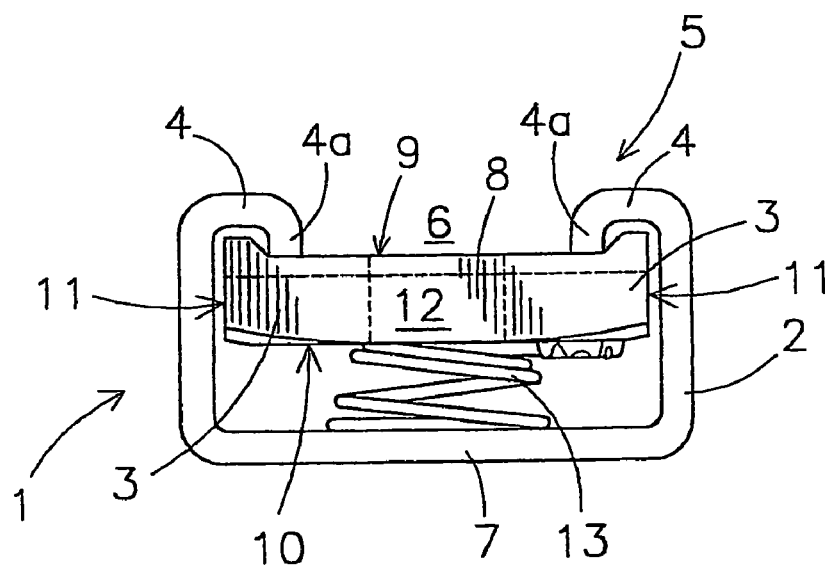
FIG. 2 shows a cross-sectional view through a securing system having a profiled-section element and a nut body in the assembled stated.

FIG. 2 shows a slightly different embodiment of a securing system 1, in which the nut body 3 does not have grooves 14. In this figure, the nut body 7 is in the assembled state, in which the nut body 3 is pressed onto the flange edge 4a by the spring 13 and is held fixedly in place in clamping fashion.

Figure 3:
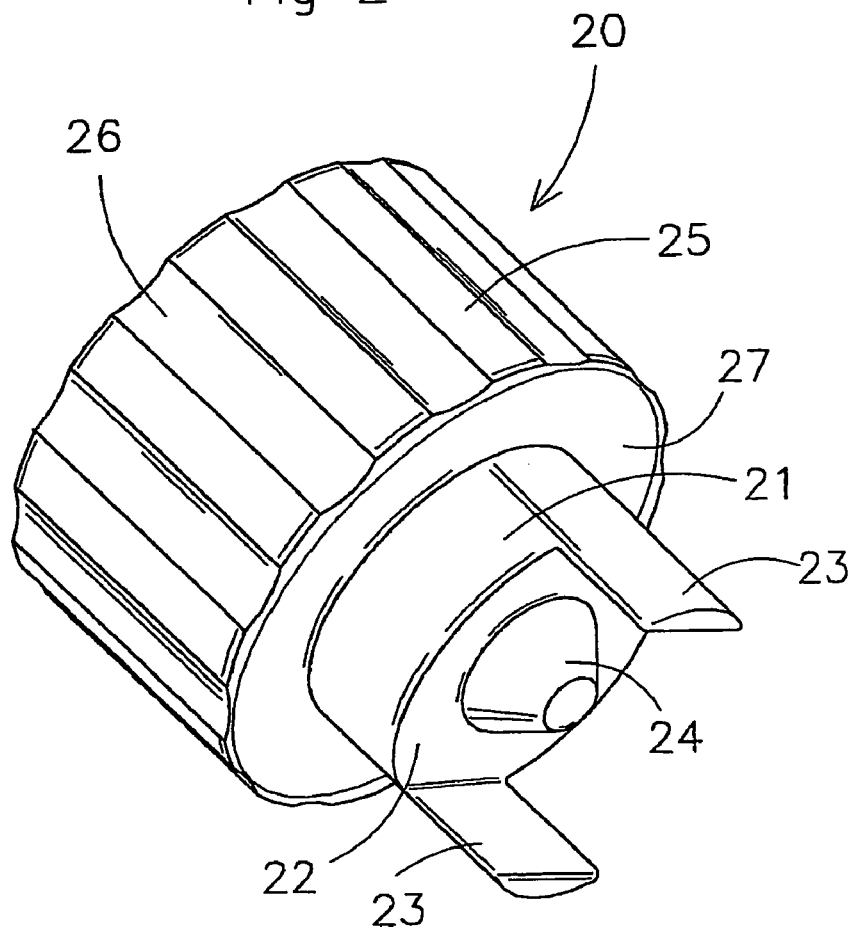
FIG. 3 shows a perspective view of an assembly tool according to the invention.

FIG. 3 shows a preferred embodiment of the assembly tool 20 according to the invention. In this embodiment, the assembly tool 20 comprises an intermediate part in the form of a pressure-exerting member 21. The pressure-exerting member 21 is provided at one end with a pressure-exerting surface 22. In this example, the pressure-exerting member 21 is formed cylindrical and the pressure-exerting surface 22 is formed substantially circular and is positioned substantially perpendicular to the centre axis of the cylindrical pressure-exerting member 21. According to the invention, the pressure-exerting member may also be designed in a form other than cylindrical, for example with a polygonal cross section and with a polygonal pressure-exerting surface. The diameter of the pressure-exerting member 21 and the pressure-exerting surface 22 is smaller than the width X of the longitudinal slot 6. The pressure-exerting member 21 and the pressure-exerting surface 22 have a diameter which approximately corresponds to the width B of the nut body 3. The axial length of the pressure-exerting member 21 is at least equal to and preferably greater than the distance between the top side 5 of the profiled-section element 2 and the underside of the inwardly bent flange edge 4a. If, in an embodiment, the flange 4 does not have a bent-over flange edge 4a, the axial length is at least equal to the distance between the top side 5 of the profiled-section element 2 and the underside of the flange 4.

Two projections 23 are arranged diagonally opposite one another on the edge of the pressure-exerting surface 22. The inner diametral distance between the projections 23 is preferably such that it is at least equal to or slightly greater than the width B of the nut body 3. The diametral distance between the outermost edges of the projections 23 is less than the width X of the longitudinal slot 6 in the profiled-section element 2. Furthermore, it is preferable for a protuberance 24, which in this example is frustoconical, but may also, for example, be cylindrical or in some other form, to be arranged in the centre.

A handling knob 25 is arranged at the other end of the pressure-exerting member 21. The handling knob 25 is substantially cylindrical, but may also be designed in some other form, for example with a polygonal cross section or in spherical form. On the outer side, the handling knob 25 is preferably provided with axial grooves 26, allowing the outer side to serve as a handgrip for the tool. However, it is also possible for other features to be arranged on the handling knob so as to form a handgrip. The diameter of the handling knob 25 is in this example greater than the width X of the longitudinal slot 6, but this is not necessarily the case. As a result, the handling knob 25 has a stop face 27 at the transition to the pressure-exerting member 21.

Figure 4:
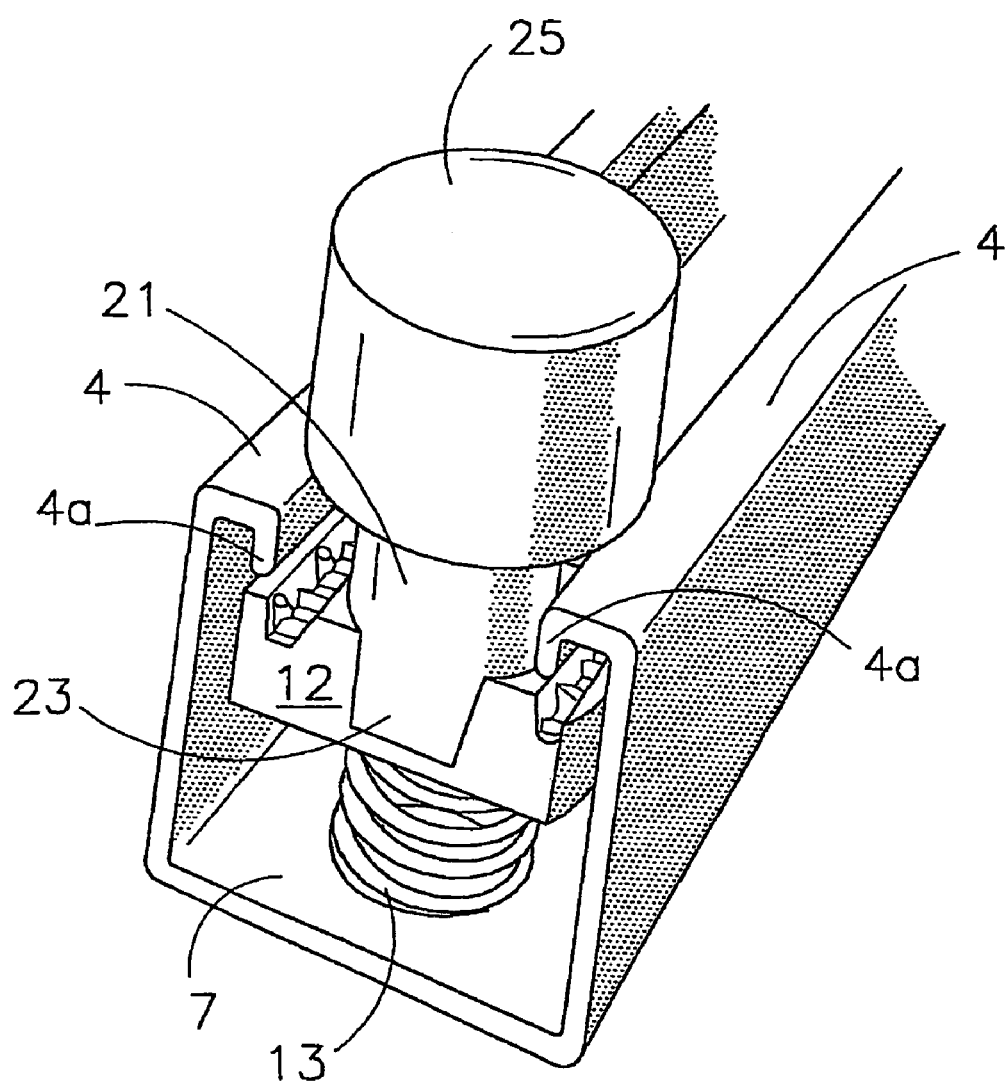
FIG. 4 shows a perspective view during assembly of the securing system shown in FIG. 1 with the aid of an assembly tool in accordance with FIG. 3.

FIG. 4 shows how the assembly tool 20 is applied to the nut body 3. The protuberance 24 has been fitted into the bore 8 in the nut body 3 (not shown), and the pressure-exerting surface 22 is resting on the top side 9 of the nut body 3. The projections 23 engage on the opposite long sides 12 of the nut body 3. The assembly tool 20 thereby engages around the nut body 3 in the width direction of the nut body 3. On account of the fact that the protuberance 24 has been received in the bore 8, the assembly tool 20 is positioned in the centre as seen in the longitudinal direction of the nut body 3. The assembly tool 20 is therefore formed in such a manner that the nut body does not have to have any additional features to enable the tool to engage thereon. As a result, the assembly tool fits onto the standard nut bodies which are commercially available at low cost. This contrasts with securing systems shown in FR 2 515 753 and DE 199 28 144, which use nut bodies which are expensive to produce. FR 2 515 753 shows a metal nut body around which a plastic support ring is fitted. At the top side, the support ring is provided with a ring in which recesses are formed for an assembly tool. DE 199 28 144 shows a nut body in which an annular section is arranged on the top side. The annular section has a bore which lies in line with the bore in the nut body. Furthermore, a slot is arranged on the top side of the annular body to enable a screwdriver head to be fitted into it.

During assembly, the longitudinal axis of the nut body 3, with the assembly tool 20 fitted to it, is brought into line with the longitudinal slot 6. Then, the nut body 3 is introduced into the profiled-section element 2 between the flanges 4 as a result of the assembly worker pushing the handling knob 25 downwards. In the process, he must at a certain time overcome the resistance of the spring 13, which at a certain time comes into contact with the base 7 of the profiled-section element 2 and engages thereon. Therefore, while the nut body 3 is being introduced through the longitudinal slot 6, the projections 23 are located between the nut body 3 and the flanges 4, and their outer sides can slide along the flange edges 4a. When the nut body 3 has been pressed sufficiently far downwards, for example when the stop face 27 of the handling knob 25 comes into contact with the top side of the profiled-section element 2, the assembly worker can rotate the handling knob 25 through approximately 90°. As a result, the nut body 3 is rotated in such a manner that it can engage behind the flange edges 4a. This situation is illustrated in FIG. 4. The spring 13 then presses the nut body 3 upwards onto the flange edges 4a, when the assembly worker is no longer pressing onto the handling knob 25.

Then, the assembly tool 20 can be moved upwards, so that it is pulled off the nut body 3. The nut body 3 remains behind in the profiled-section element 2 in the assembled state, as shown in FIG. 2.

FIGS. 1, 2 and 4 show how the spring 13 engages on the base 7 of the profiled-section element 2. If the nut body 3 is displaced in the longitudinal direction in the profiled-section element 2 in order to reach the correct position, the spring 13 slides over the base 7 of the profiled-section element 2. The profiled-section element 2 often has securing holes (not shown) in the base 7. The free ends of the spring 13 can then become hooked behind the edges of the securing holes, making assembly more difficult.

Figure 5:
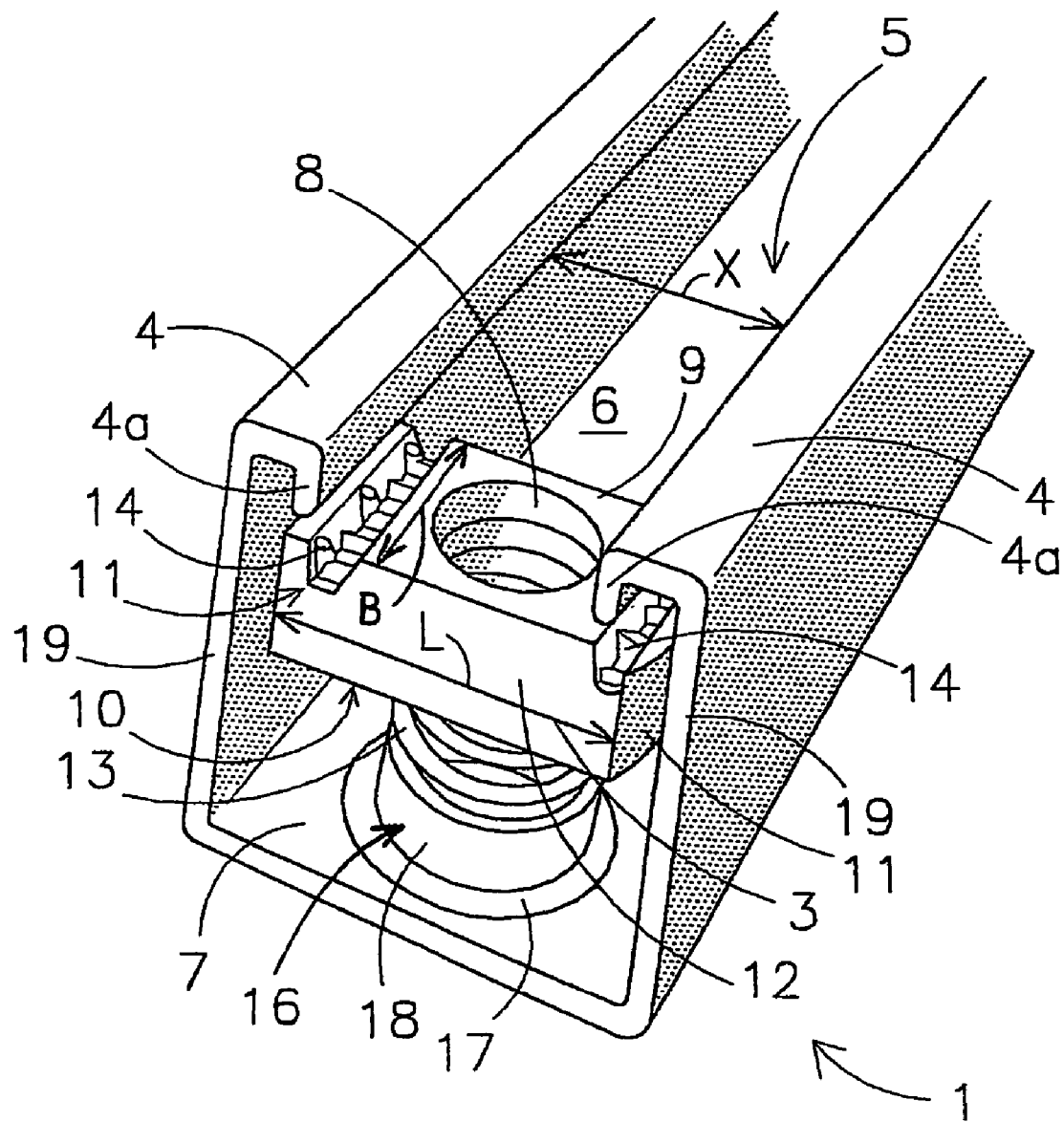
FIG. 5 shows a perspective view of a securing system in accordance with a second aspect of the invention, having a profiled-section element and a first embodiment of a nut body.

FIG. 5 shows a solution to this problem. The spring 13 is provided, at the end which engages on the base 7 of the profiled-section element 2, with a sliding part 16 which is preferably made from plastic and in this example comprises a hollow cylinder part 18, which surrounds the bottom end of the spring 13, and a flat sliding foot 17, which closes off the hollow cylinder part 18 at the underside. The hollow cylinder part 18 can then engage in clamping fashion on the outer circumference of the coil spring.

In the assembled state, the sliding foot 17 engages on the base 7 of the profiled-section element 2. The sliding foot 17 is such that it has a greater width than the smallest dimension of the respective securing holes. The sliding foot 17 is in this case circular, but may also, for example, be rectangular, the sliding foot having a width which is less than the width X of the longitudinal slot 6 in the profiled-section element 2 and a length which is less than the distance between the side walls 19 of the profiled-section element 2. The sliding foot 17 slides without problem over the base 7, and the spring 13 cannot become hooked behind the hole edges.

The sliding foot 17 preferably has a small thickness, and the wall thickness of the cylinder part 18 is preferably also small, this being favourable with a view to the possible use of the sliding part 16 in a profiled-section element of small height, i.e. with a low height of the side walls 19.

Figure 6:
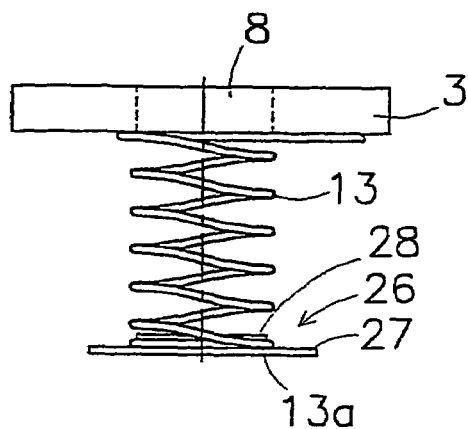
FIG. 6 shows a second embodiment of a nut body for a securing system in accordance with the second aspect of the invention.
Figure 7:
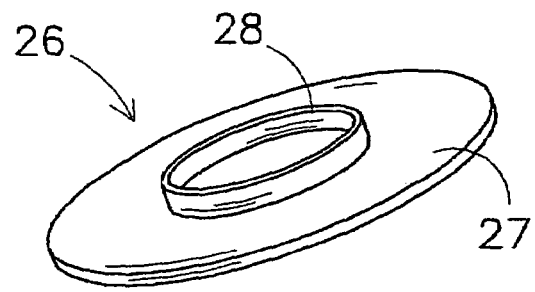
FIG. 7 shows a perspective view of the sliding part from FIG. 6.
Figure 8:
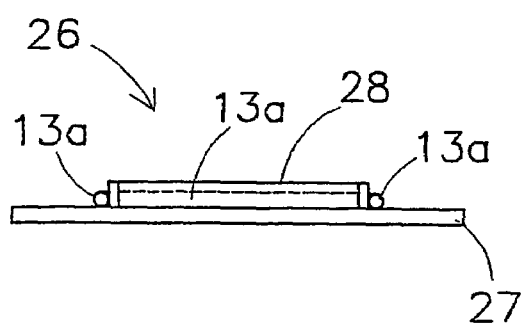
FIG. 8 shows a cross section through the sliding part shown in FIG. 6.

FIG. 6 illustrates another embodiment of a nut body 3 with a coil spring 13, which is preferably made from spring steel, and a sliding part 26, which is arranged at the free end of the spring 13 and has a sliding foot 27. FIG. 7 shows the sliding part 26, clearly showing that a protuberance 28, in this example an annular protuberance, is arranged on the sliding foot 27. In this embodiment, the sliding foot 27 is designed as a circular plate. The annular protuberance 28 preferably has an external diameter which approximately corresponds to the internal diameter of the free end of the spring 13, so that the annular protuberance 28 fits inside the bottom turn of the spring 13. The annular protuberance preferably fits in clamping fashion into the bottom turn of the spring 13. This is clearly apparent from the cross section shown in FIG. 8, in which the bottom turn is denoted by 13a and this turn bears taut around the annular protuberance 28. The sliding part 26 is preferably made from plastic. The sliding foot 27 is preferably of low thickness, and the wall thickness of the annular protuberance 28 is preferably also low, which is favourable with a view to the possibility of using the sliding part 26 in a profiled-section element of low height.

As an alternative to an annular protuberance, it is also possible for protuberances positioned on an imaginary circle to be applied to the sliding foot (not shown), in which case the circumference around the protuberances has a diameter which approximately corresponds to the internal diameter of the free end of the coil spring.

Figure 9:
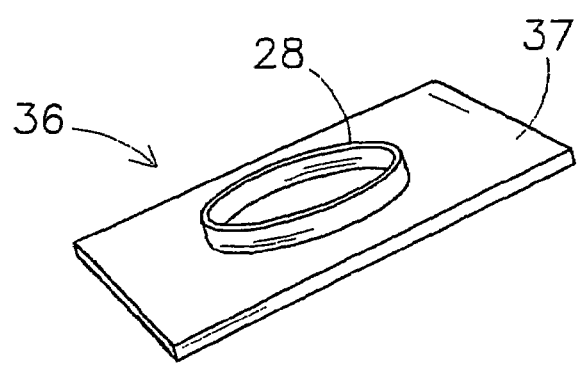
FIG. 9 shows a perspective view of another embodiment of a sliding part.

FIG. 9 shows a similar embodiment of a sliding part 36 with a sliding foot 37 which is designed as a substantially rectangular plate. The annular projection 28 is also identical to the annular protuberance of the embodiment shown in FIGS. 6 and 7. In this case too, the sliding foot 37 is designed with a low thickness, and is also preferred with a view to use in a profiled-section element of low height.

The sliding parts 16, 26, 36 according to the invention create a simple and inexpensive solution to the problem of the spring becoming hooked behind the edges of the securing holes in the profiled-section element, making it easier for the nut body with the spring to be displaced in the longitudinal direction inside the profiled-section element. The sliding parts 16, 26, 36 may, for example, be supplied separately or preassembled as part of a package comprising a plurality of nut bodies 3. Preassembly of the sliding parts on the springs of the nut bodies has the additional advantage that the free ends of the springs in the package cannot become hooked into one another so that an assembly worker is not constantly having to separate the springs of various nuts from one another before he can use them.

The assembly tool 20 according to the first aspect of the invention may also be supplied in a package with a plurality of nut bodies 3, which may also include sliding parts 16, 26, 36.

It should be noted that although the embodiments shown in each case show a coil spring, the invention also relates to an embodiment comprising other types of spring.

The invention claimed is:

1. An assembly tool for arranging an elongate nut body provided with a bore and on the underside provided with a downwardly projecting spring into an elongate profiled-section element having a top side with a longitudinal slot which is delimited by two flanges, the assembly tool comprising;

an engagement part for engaging on the nut body, an intermediate part connected to the engagement part, and a handling member connected to the intermediate part allowing the tool to be handled, wherein the engagement part comprises a pressure-exerting surface, at least one projection which extends from the pressure-exerting surface substantially perpendicular to the pressure-exerting surface, and a protuberance arranged on the pressure-exerting surface, said pressure-exerting surface having a minimum cross-sectional dimension which is no larger than the width of the longitudinal slot, and formed to abut the top side of the nut body during use so as to press the nut body into the profiled-section element between the flanges of the profiled-section element, said projection being formed to abut a long side of the nut body during use, so that a rotary movement of the handling member and the pressure-exerting surface about an axis of rotation which extends substantially perpendicular to the pressure-exerting surface results in a rotary movement of the nut body, said protuberance being formed to abut within the bore in the nut body when the pressure-exerting surface during use abuts the top side of the nut body, and wherein the handling member exerts a compressive force and a rotational force on the nut body at a distance from the pressure-extending surface.

2. The assembly tool according to claim 1, wherein the handling member of the assembly tool comprises a handgrip.

3. The assembly tool according to claim 1, wherein the intermediate part comprises a body with a maximum cross-sectional dimension which is smaller than the width of the longitudinal slot in the profiled-section element, the handling member being formed at one end of the body and the pressure-exerting surface being formed at the other end of the body, the pressure-exerting surface being positioned substantially perpendicular with respect to the centre axis of the body.

4. The assembly tool according to claim 1, wherein the handling member has a minimum cross-sectional dimension which is larger than the width of the longitudinal slot in the profiled-section element, and in that the distance in the axial direction from the pressure-exerting surface to the handling member is at least equal to the distance between the top side of the profiled-section element and the bottom edge of the flange.

5. The assembly tool according to claim 1, wherein the pressure-exerting surface has a cross-sectional dimension which approximately corresponds to the width of the nut body.

6. The assembly tool according to claim 1, wherein the protuberance is located in the centre of the pressure-exerting surface.

7. The assembly tool according to claim 1, wherein two projections are arranged opposite one another on either side of the edge of the pressure-exerting surface in order, during use, to engage on the opposite long sides of the nut body, the distance between the outermost edges of the projections being smaller than the width of the longitudinal slot of the profiled-section element.

8. The assembly tool according to claim 7, wherein the projections are designed to abut in clamping fashion on the nut body.

9. The assembly tool according to claim 1, wherein the handling member, the intermediate part and the engagement part are formed as an integral unit.

10. The assembly tool according to claim 1, wherein it is made from plastic.

11. The assembly tool according to claim 1, wherein a direction indicator is arranged on the handling member for indicating the position of the assembly tool and the nut body with respect to the longitudinal slot in the profiled-section element during assembly.

12. A method for mounting an elongate nut body provided with spring means in an elongate profiled-section element by means of an assembly tool, wherein said profiled-section element has a top side which is provided with two flanges which delimit a longitudinal slot, and said profiled-section element also has a base lying opposite a top side, wherein said nut body has a width which is less than the width of the longitudinal slot in the profiled-section element and a length which is greater than the width of the profiled-section element, wherein said nut body also has a top side, an underside, two short sides and two long sides, the nut body being provided with a bore and on the underside also being provided with a downwardly projecting spring, wherein said assembly tool has an engagement part having a pressure-exerting surface, at least one projection which extends from the pressure-exerting surface substantially perpendicular to the pressure-exerting surface, and a protuberance arranged on the pressure-exerting surface, and wherein when said assembly tool is rotated that the nut body engages behind the flanges and the spring presses the nut body towards the top side of the profiled-section element and onto the flanges, said method comprising the steps of;

abutting said assembly tool against the top side of the nut body, so that said pressure exerting member abuts the top side of the nut body, said projection abuts a long side of the nut and said protuberance abuts within the bore in the nut body, bringing the longitudinal axis of the nut body into line with the longitudinal slot, and moving the nut body with the aid of the assembly tool into the profiled-section element between the flanges, with its underside facing the base of the profiled-section element, so that the spring engages on the base of the profiled-section element, rotating said assembly tool so that the nut body is rotated, in such a manner that the nut body engages behind the flanges, and removing said assembly tool from the nut body by means of a pulling movement.

13. A package which includes a plurality of elongate nut bodies, each of which has a bore and a downwardly projecting spring on an underside thereof, and an assembly tool for arranging each of said elongate nut bodies into an elongate profiled-section element having a top side and two flanges which delimit a longitudinal slot, wherein the assembly tool has an engagement part for engaging on the nut body, an intermediate part connected to the engagement part and a handling member connected to the intermediate part allowing the tool to be handled, wherein the engagement part comprises a pressure-exerting surface, at least one projection which extends from the pressure-exerting surface substantially perpendicular to the pressure-exerting surface, and a protuberance arranged on the pressure-exerting surface, said pressure-exerting surface having a minimum cross-sectional dimension that is no larger than the width of the longitudinal slot, and formed to abut the top side of the nut body so as to press the nut body into the profiled-section element between the flanges of the profiled-section element, said projection being formed to abut a long side of the nut body during use, so that a rotary movement of the handling member and the pressure-exerting surface about an axis of rotation which extends substantially perpendicular to the pressure-exerting surface results in a rotary movement of the nut body, said protuberance being formed to abut within the bore in the nut body when the pressure-exerting surface during use engages the top side of the nut body, and wherein the handling member exerts a compressive force and a rotational force on the nut body at a distance from the pressure-exerted surface.

* * * * *